Patented July 25, 1933

1,919,936

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

DISINFECTANT COMPOSITION

No Drawing. Application filed May 19, 1928. Serial No. 279,214.

This invention relates to certain new and effective seed disinfectant compositions, and particularly to compositions of this nature containing alkyl and aryl mercury iodides in a form which renders them particularly well adapted for the purpose above mentioned.

Gassner and Ilse Esdorn, "Arbeiten aus der Biologischen Reichsanstalt, vol. 11, pp. 375–377", reported the results of tests made in the treatment of stinking smut spores with solutions of methyl mercuric iodide. They reported this material to be extremely effective against these spores. In spite of this, however, the product has not been used for the control of plant disease, because of its toxicity to animal life and because of the fact that solutions of this kind were found to cause severe injury to seeds and plants.

I have discovered that if compositions containing alkyl and aryl mercuric iodides are employed in small percentages, mixed with dry materials such, for example, as infusorial earth, clay, etc., I can obtain excellent control of seed borne diseases by dusting the seed with these compositions, without the severe injury to the seed which resulted from the treatment previously reported.

By way of description of the compositions comprising my invention, the following is given, but it will be understood that other embodiments exist and may be practiced without departing from the spirit of the invention.

Example I

A dust composition comprising 1.5 parts ethyl mercuric iodide and 98.5 parts of infusorial earth in intimate admixture is applied to wheat in the proportion of 2 ounces to the bushel of seed. This treatment gives effective control of stinking smut and other seed borne diseases.

Example II

A dry, finely powdered mixture containing 2% of phenyl mercuric iodide, 5% calcium hydroxide, and 93 parts clay is prepared. This composition can be dusted on seeds and will be found to be extremely effective in the control of seed borne disease.

While dusts containing both alkyl and aryl mercury iodides can be used for my purpose, I have found the alkyl mercury iodides to be particularly effective, and the use of these is preferable for the purposes indicated.

I have also found that these organic mercury iodides can be used in the dry, finely powdered composition described above, together with other active disinfecting materials, e. g., copper carbonate, paraformaldehyde, calcium arsenate, etc.

As many apparently widely different embodiments of this invention may be made without departing from the spirit and scope thereof, it is to be understood that I do not limit myself to the specific embodiments thereof except as defined in the appended claims.

I claim:

1. A disinfectant in dust form for the control of seed and plant diseases, comprising a mercury compound of the type R-Hg-I, in which R is a hydrocarbon radical.

2. A disinfectant in dust form for the control of seed and plant diseases, comprising a mercury compound of the type R-Hg-I, in which R is an alkyl group.

3. A disinfectant in dust form for the control of seed and plant diseases, comprising an alkyl mercury iodide and a diluting agent.

4. A disinfectant in dust form for the control of seed and plant diseases, comprising ethyl mercuric iodide and a diluting agent.

MAX ENGELMANN.